Figure 1:
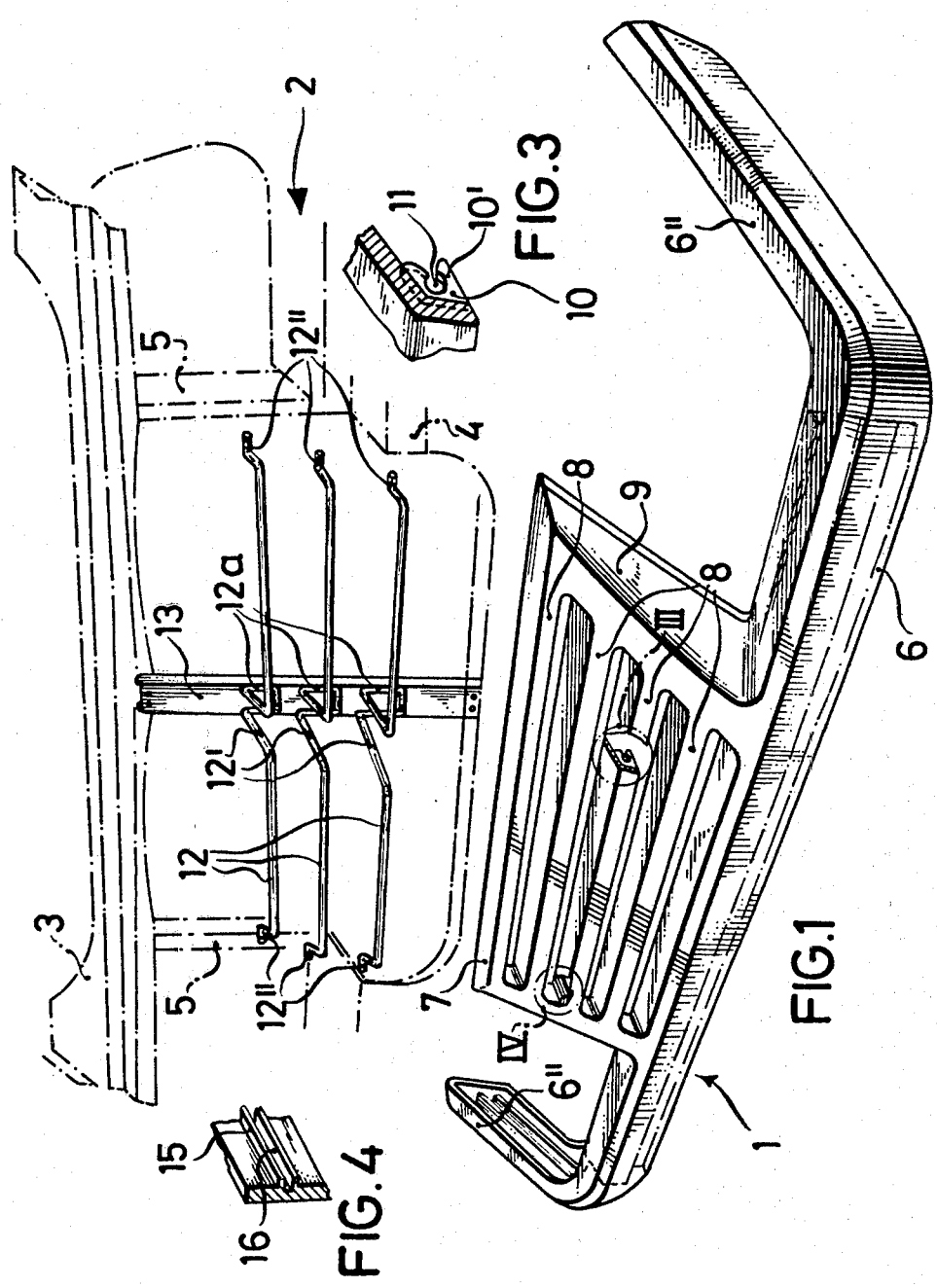

United States Patent [19]

Trabert

[11] 4,406,489
[45] Sep. 27, 1983

[54] MOTOR VEHICLE FRONT PART MADE OF PLASTICS

[75] Inventor: Hans-Gerhard Trabert, Rüsselsheim, Fed. Rep. of Germany

[73] Assignee: General Motors Corporation, Detroit, Mich.

[21] Appl. No.: 283,831

[22] Filed: Jul. 16, 1981

[30] Foreign Application Priority Data

Jul. 24, 1980 [DE] Fed. Rep. of Germany ....... 8019864

[51] Int. Cl.³ .................. B62D 25/08; B62D 39/00
[52] U.S. Cl. ................................ 293/115; 296/31 P
[58] Field of Search .............. 293/122, 115, 102, 126, 293/155; 296/31 R, 31 P

[56] References Cited

U.S. PATENT DOCUMENTS

| | | |
|---|---|---|
| 2,329,874 | 9/1943 | Cadwallader et al. ............ 293/115 |
| 2,566,605 | 9/1951 | Ekornaas ............................ 293/115 |
| 2,578,068 | 12/1951 | Johnson ............................. 293/115 |
| 3,583,756 | 6/1971 | Wilfert .................................. 296/31 |
| 3,827,741 | 8/1974 | Howell ................................. 293/99 |
| 3,841,682 | 10/1974 | Church et al. ........................ 293/71 |
| 4,095,831 | 6/1978 | Hagiwara et al. .................... 293/62 |

*Primary Examiner*—Richard A. Bertsch
*Attorney, Agent, or Firm*—William A. Schuetz

[57] ABSTRACT

This disclosure relates to an integrally molded plastic bumper and radiator grille which is attached to a front end of an automotive vehicle. The radiator grille has means for snap fittingly engaging a plurality of resilient wire yokes carried by the front end of the vehicle whereby the yokes connect the radiator grille to the vehicle and function as a stabilizer means to support the radiator grille when connected to the vehicle.

6 Claims, 4 Drawing Figures

MOTOR VEHICLE FRONT PART MADE OF PLASTICS

The present invention relates to a motor vehicle front end assembly and, more particularly, to a motor vehicle front part made of plastics material which consists of a bumper and a radiator grille having horizontally extending plates molded in one piece therewith and which is securable to a carrying system on the vehicle body by way of resilient stabilizing parts.

Such a motor vehicle front part, which is often also designated as a "soft-nose" construction and—as is well known—may also comprise cavities for accommodating the headlamp casings or a spoiler as a one-piece component, is produced from a foamed polyurethane or is injection-molded from a thermoplastic substance. It is also provided with metallic stabilizing parts for increasing the natural stability and for ensuring its adaptation to the steps taken for providing connections at the vehicle body. Particularly with vehicle front parts of thermoplastic material having parallel, mutually spaced horizontal plates as a radiator grille, the natural stability of the plates is not adequate and, in the course of time this may lead to a certain instability of form, due to environmental influences.

The task of the present novelty or invention is to increase the natural stability of the plates forming the radiator grille and to ensure its stability of form even after lengthy periods. According to the present novelty or invention, for this purpose the plates of the radiator grille at the vehicle front part of the above-mentioned kind, are borne by wire yokes which are secured to a support of a carrying system and which are engageable in arresting cavities in the plates and in the side walls of the radiator grille which connects the plate ends. At the same time, advantageously the wire yokes extend along the underside of the plates arranged in parallel spacing from each other, and they engage by means of their ends offset into L-shape, in holes in the side walls directed towards the vehicle body. Due to this formation and arrangement, it is possible to reduce the constructional and material costs, and the expenditure for the injection mold and for the vehicle front part. This is because, in their shaping, the plates do not have to be designed in a special manner ensuring their natural stability (i.e. by an appropriate material-intensive method); nor do they require additionally molded-on reinforcing or stiffening members which complicate the injection tool or molds and make it expensive. The resilient wire yokes by reason of their support, increase the natural stability of the plates, without limiting their natural elasticity beyond a certain amount. Consequently, the insensitivity of the plates to fairly low impact loading is unimpaired.

Figure 2:
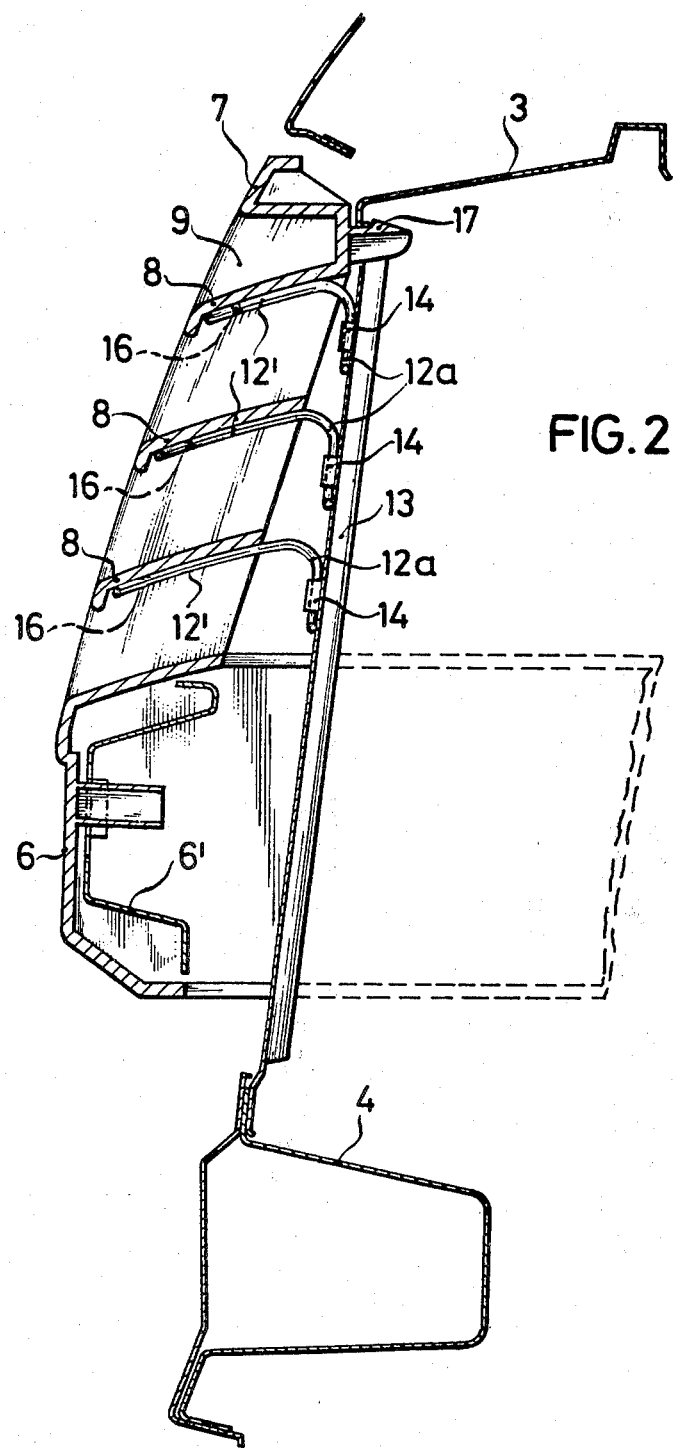

Further details of the advantages of the present invention will be apparent from the claims as well as from a detailed description of the preferred embodiment made with reference to the accompanying drawings in which:

FIG. 1 shows a preferred embodiment of a motor vehicle front part in a perspective exploded presentation, with respect to the vehicle bodywork, FIG. 2 is a longitudinal cross-sectional view taken through the vehicle front part in the mounted position on the vehicle body, FIG. 3 is an enlarged partial cross-sectional view taken through a plate of the radiator grille as indicated in the cut-away designated by numeral III in FIG. 1, and FIG. 4, as indicated, is an enlarged partial cross-sectional view taken through the side of the radiator grille as indicated in the cut-away designated by numeral IV in FIG. 1.

Reference numeral 1 generally indicates an exposed motor vehicle front part, whilst 2 generally designates the front portion of a vehicle body (shown schematically and partially only), 3 indicates an upper cross-member connecting the two wheel arches and 4 a lower cross-member, and finally 5 illustrates lateral supports which connect the two cross-members 3, 4.

The front part 1 consists of a one piece injection-molded thermoplastic part including a bumper 6 and a radiator grille 7. In a manner which is already known (and is therefore only indicated schematically) the bumper 6 is armored with a metallic insert 6' at its inner face directed towards the bodywork. During assembly, the bumper 6 is secured (in a manner not indicated) by central holders to the two side members of the floor construction of the vehicle, by way of the armoring 6', and is attached in the region of the fender by the bumper ends 6" led laterally round the vehicle body.

The radiator grille 7 is provided with several plates or horizontally extending portions 8 which run substantially horizontally and are vertically spaced from each other in a parallel arrangement. They are integral with and bounded by slightly diverging side walls or portions 9 formed on the bumper 6. As best shown in FIGS. 1 and 2, the plates 8 are approximately L-shaped in cross-section and are provided with resilient clamp-shaped stays or clamps 10 which are integrally molded on the underside thereof at both sides of the axis of symmetry of the radiator grille 7. As best shown in FIG. 3, the resilient clamps 10 have arresting cavities 11 which are adapted to snap fittingly receive and engage a supporting framework.

The supporting framework consists of one or more vertically spaced resilient wire yokes 12 which are attachable to the front portion 2 of the vehicle body. The supporting framework consists, in the illustrated embodiment, of three, generally horizontally disposed, spring-steel wire yokes 12. As best shown in FIG. 1, the yokes 12 comprise a U-shaped mid-portion 12a intermediate their ends which is generally vertically disposed. The U-shaped mid-portions 12a are mounted in shackles 14 secured to a vertically disposed middle support or carrier means 13 connected to the cross members 3, 4. The yokes 12 also include forwardly extending portions 12' integral with the legs of the U-shaped portions 12a, horizontally extending frontal portions integral with the portions 12' at their ends remote from the U-shaped portions 12a and which extend perpendicular to the portions 12' and generally L-shaped, rearwardly extending free end portions 12" integral with the frontal portions at their ends remote from the portions 12'.

The free ends 12" of the resilient yokes 12 are adapted to engage the bottom surface of U-shaped channel or grooves 15 formed integral with the side walls 9 at their inner faces and be deflected rearwardly during assembly until the ends 12" are aligned with holes 16 formed in the bottom surfaces of the grooves 15 whereupon the ends 12" snap into the holes 16.

It should be apparent from the above description and the drawings, that during assembly of the radiator grille 7 to the supporting framework, the resilient clamps 10 on the plates 8 of the radiator grille 7 are snap or force fitted over the frontal portions of the yokes 12 with the frontal portions being received in the arresting cavities 11 and that the yokes 12 are deflected rearwardly as a result of the engagement of the free ends 12" with the bottom of the grooves 15 until the free ends 12" are aligned with the holes 16 whereupon the inherent return bias of the spring yokes 12 causes the ends 12" thereof to snap into the holes 16. This connects or attaches the radiator grille to the yokes 12. As best shown in FIG. 2, the yokes 12 engage the undersurfaces of the plates 8 whereby the plates 8 are resiliently supported by the yokes 12.

In the illustrated and preferred embodiment, the radiator grille 7 also includes three integrally molded (only one of which is shown), rearwardly extending clips 17 which are snap fittingly pushed through suitable openings in the cross member 3 to additionally lock the radiator grille 7 to the cross member 3 of the vehicle.

The embodiments of the invention in which an exclusive property or privilege is claimed are defined as follows:

1. In an automotive vehicle having front support structure, an exposed plastic front part including a radiator grille having a plurality of vertically spaced, horizontally extending front portions and integral rearwardly extending side portions at the opposite ends of the front portions and an attachment means for attaching said radiator grille to said vehicle support structure, said attachment means including a plurality of vertically spaced resilient wire yokes carried by said front support structure of said vehicle, said wire yokes including generally horizontally extending front portions and rearwardly extending portions at their opposite ends which terminate in free ends, said front and said portions of said radiator grille having means defining arresting cavities for snap fittingly receiving said front and rearwardly extending portions of said wire yokes and attaching said radiator grille to said resilient wire yokes.

2. In an automotive vehicle having front support structure, an exposed plastic front part including a bumper and a radiator grille molded in one piece and with said radiator grille having a plurality of vertically spaced horizontally extending front portions and integral rearwardly extending side portions at the opposite ends of the front portion and an attachment means for attaching said front part to said vehicle support structure, said attachment means including a plurality of vertically spaced resilient wire yokes carried by said front support structure of said vehicle, said wire yokes including generally horizontally extending front portions and rearwardly extending portions at their opposite ends which terminate in free ends, said front and side portions of said radiator grille having means defining arresting cavities for receiving and snap-fittingly engaging said front and rearwardly extending portions of said wire yokes to connect said radiator grille to said resilient wire yokes.

3. In an automotive vehicle having spaced sides and a front support structure including a carrier means located intermediate the sides of the vehicle, an exposed plastic front part including a bumper and a radiator grille molded in one piece and with the radiator grille being located between the opposite side ends of the bumper and having a plurality of vertically spaced horizontally extending front portions and integral side portions at the opposite ends of the front portion, and an attachment means for attaching said plastic front part to said carrier means of said vehicle support structure, said attachment means including a plurality of vertically spaced resilient wire yokes supported intermediate their ends by said carrier means of said front support structure of said vehicle, said wire yokes including generally horizontally extending front portions and rearwardly extending free end portions at their ends remote from said carrier means, said front and side portions of said radiator grille respectively having means defining arresting cavities for receiving and snapfittingly engaging said front and rearwardly extending portions of said wire yokes to attach said radiator grille to said resilient wire yokes.

4. In an automotive vehicle, as defined in claim 3, and wherein said first means of said front portion of said radiator grille comprises integral resilient clamps for snap fittingly engaging said front portions of said wire yokes and said second means of said side portions of said radiator grille comprises a U-shaped section having a hole in its bottom for slidably and snap fittingly receiving the free ends of said wire yokes.

5. In an automotive vehicle, as defined in claim 3, and wherein said wire yokes intermediate their ends include a vertically disposed U-shaped section which is secured to said carrier means.

6. In an automotive vehicle having spaced sides and a front support structure including a vertically disposed carrier means located intermediate the sides of the vehicle, an exposed plastic front part including a bumper and a radiator grille molded in one piece and with the radiator grille being located between the opposite side ends of the bumper and having a plurality of vertically spaced, downwardly sloping horizontally extending front portions and integral side portions at the opposite ends of the front portion, and an attachment means for attaching said plastic front part to said carrier means of said vehicle support structure, said attachment means including a plurality of vertically spaced resilient wire yokes, said yokes each having a vertically disposed U-shaped portion intermediate its ends which is secured to said carrier means, a forwardly extending portion integral with each leg of the U-shaped portion, a horizontally extending front portion integral with and extending perpendicular to said forwardly extending portion at its end remote from said U-shaped portion and a rearwardly extending L-shaped free end portion integral with the front portion at its end remote from the forwardly extending portion, said front portions of said radiator grille having integral resilient clamps for snap fittingly engaging said front portions of said wire yokes and said side portions of said radiator grille having a U-shaped guide and hole for snap fittingly receiving the free ends of said wire yokes whereby said radiator grille is attached to said wire yokes.

* * * * *

UNITED STATES PATENT AND TRADEMARK OFFICE
CERTIFICATE OF CORRECTION

PATENT NO. : 4,406,489
DATED : September 27, 1983
INVENTOR(S) : Hans-Gerhard Trabert It is certified that error appears in the above-identified patent and that said Letters Patent are hereby corrected as shown below:

Column 3, line 34, delete "said" (second occurrence) and insert therefor -- side --.

Signed and Sealed this

Seventeenth Day of July 1984

[SEAL]

Attest:

GERALD J. MOSSINGHOFF

*Attesting Officer*     *Commissioner of Patents and Trademarks*